United States Patent
Ogane (10) Patent No.: US 9,798,045 B2
(45) Date of Patent: Oct. 24, 2017

(54) ANTIREFLECTION FILM AND METHOD OF PRODUCING THE SAME

(75) Inventor: Masanobu Ogane, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 13/882,050

(22) PCT Filed: Oct. 5, 2011

(86) PCT No.: PCT/JP2011/073461
§ 371 (c)(1),
(2), (4) Date: Apr. 26, 2013

(87) PCT Pub. No.: WO2012/066871
PCT Pub. Date: May 24, 2012

(65) Prior Publication Data
US 2013/0222916 A1    Aug. 29, 2013

(30) Foreign Application Priority Data

Nov. 17, 2010  (JP) ................. 2010-257148

(51) Int. Cl.
*G02B 27/00*  (2006.01)
*G02B 1/11*  (2015.01)
(Continued)

(52) U.S. Cl.
CPC ............... *G02B 1/11* (2013.01); *B82Y 20/00* (2013.01); *B82Y 30/00* (2013.01); *C09D 5/006* (2013.01);
(Continued)

(58) Field of Classification Search
CPC ........ G02B 1/11; G02B 5/0242; G02B 5/282; G02B 1/105; G02B 1/14; G02B 1/111; G02B 5/223; G02B 5/22; G02B 27/00
(Continued)

(56) References Cited

U.S. PATENT DOCUMENTS 6,870,602 B2    3/2005 Ishizawa et al.
2007/0103786 A1 *  5/2007 Muramatsu ................. 359/599
(Continued)

FOREIGN PATENT DOCUMENTS

CN    101002113 A    7/2007
EP    1 445 095 A1    8/2004
(Continued)

OTHER PUBLICATIONS

First Office Action in Chinese Application No. 201180054659.X (dated Dec. 10, 2013).

*Primary Examiner* — Bumsuk Won
*Assistant Examiner* — Balram Parbadia
(74) *Attorney, Agent, or Firm* — Fitzpatrick, Cella, Harper & Scinto (57) ABSTRACT

An antireflection film, comprising a film including: hollow particles; and a binder bonding the particles, wherein: the binder contains voids; and the binder contains 10 or less voids each having a cross-sectional area of 1,000 nm$^2$ or more with respect to 1 μm$^2$ of a cross-sectional area of the binder. A method of producing the film, comprising: forming a paint into a film by applying the paint onto a substrate, the paint containing hollow particles, a binder, and a solvent, in which a content of the particles is 50-85 wt % and a content of the binder is 15-40 wt % with respect to a total weight of a solid content of the paint, and the paint has a viscosity of 1.3-2 mPa·s at its film-forming temperature; and drying the film.

15 Claims, 3 Drawing Sheets (51) Int. Cl.
*B82Y 20/00* (2011.01)
*B82Y 30/00* (2011.01)
*C09D 5/00* (2006.01)
*C09D 7/12* (2006.01)
*G02F 1/1335* (2006.01)

(52) U.S. Cl.
CPC ......... *C09D 7/1266* (2013.01); *C09D 7/1291* (2013.01); *G02B 2207/107* (2013.01); *G02F 1/133502* (2013.01)

(58) Field of Classification Search
USPC ............... 359/349, 362, 428, 430, 599, 301
See application file for complete search history.

(56) References Cited

U.S. PATENT DOCUMENTS

2007/0116902 A1* 5/2007 Muramatsu et al. ........ 428/1.31
2007/0200147 A1 8/2007 Ohtani et al.
2008/0080055 A1* 4/2008 Lightfoot et al. ............ 359/599
2010/0196655 A1* 8/2010 Kai et al. ..................... 428/110
2011/0195239 A1* 8/2011 Takane ............ B29D 11/00865
428/206

FOREIGN PATENT DOCUMENTS

| | | | | |
|---|---|---|---|---|
| EP | 1445095 A1 * | 8/2004 | ............... | B32B 7/02 |
| EP | 1 806 600 A2 | 7/2007 | | |
| EP | 1806600 A2 * | 7/2007 | ............... | G02B 1/11 |
| JP | 2001-233611 A | 8/2001 | | |
| JP | 2005-134609 A | 5/2005 | | |
| JP | 2006-151800 A | 6/2006 | | |
| JP | 2008-139581 A | 6/2008 | | |
| JP | 2009-73170 A | 4/2009 | | |
| JP | 2009-108155 A | 5/2009 | | |
| WO | 02/018982 A1 | 3/2002 | | |

* cited by examiner

ANTIREFLECTION FILM AND METHOD OF PRODUCING THE SAME

TECHNICAL FIELD

The present invention relates to an antireflection film having good wear resistance and good transparency and a method of producing the same.

BACKGROUND ART

In order to suppress light reflection at the light incident and output interface of an optical device, it has been conventionally known to form an antireflection film by laminating single-layer or multiple-layer optical films each having a different refractive index so as for the antireflection film to have a thickness of several ten to several hundred nanometers. In order to form such antireflection film, there is used a vacuum film-forming method such as vapor deposition or sputtering or a wet film-forming method such as dip coating or spin coating.

It is known to use, as a material used for forming the outermost layer of the antireflection film, a transparent material having a low refractive index selected from inorganic materials such as silica, magnesium fluoride, and calcium fluoride and organic materials such as a silicone resin and an amorphous fluororesin.

In recent years, it has been known to use a low refractive index film utilizing the refractive index of air 1.0 for the antireflection film in order to accomplish a lower reflectance. It is possible to reduce the refractive index of a layer of silica or magnesium fluoride by forming voids in the layer. For example, the refractive index of a thin film of magnesium fluoride, i.e., 1.38 can be reduced to 1.27 by forming voids accounting for 30% of the volume of the thin film therein.

It is known that an antireflection film having a low refractive index is provided by using a method of forming voids involving forming fine particles of silica or magnesium fluoride into a film with a binder and forming voids in the binder between the fine particles (Patent Literatures 1 and 2).

Moreover, there is known, as another method of forming voids, a method involving forming voids in particles by using hollow silica particles. This is a method of forming an antireflection film by using the hollow particles (Patent Literature 3).

On the other hand, it is known that, when hollow silica particles are used for making an optical member such as an antireflection film, problems may occur in the transparency and outer appearance of the optical member. This is because the hollow silica particles have poor affinity to an organic solvent and an organic polymer which are mixed with the particles, and hence the hollow silica particles aggregate when the mixture is formed into a paint, and light scattering is caused in the optical member. In order to solve the problem, there is known a method involving forming a film by using a paint free of an organic polymer, thereby suppressing the aggregation to produce a low refractive index film not causing light scattering, and yielding an antireflection film using the low refractive index film (Patent Literature 4).

CITATION LIST

Patent Literature

PTL 1: Japanese Patent Application Laid-Open No. 2006-151800

PTL 2: International Patent WO02/018982A

PTL 3: Japanese Patent Application Laid-Open No. 2001-233611

PTL 4: Japanese Patent Application Laid-Open No. 2009-73170

However, the antireflection film described in Patent Literature 4 does not include any binder typified by an organic polymer for suppressing light scattering. The outermost layer of an antireflection film is required to have a low refractive index and good transparency and also to have good wear resistance, and hence such film containing no binder has a problem of insufficient wear resistance.

On the other hand, there has been a problem in that, when voids are also formed in a binder by using a space between hollow particles in order to provide a lower refractive index to an antireflection film, the aggregation of the particles and the like cause the sizes of the voids non-uniform, with the result that voids each having a larger size locally exist, leading to insufficient transparency in the antireflection film.

SUMMARY OF INVENTION

Technical Problem

The present invention has been made in view of the background art described above and provides an antireflection film having good wear resistance and good transparency and a method of producing the antireflection film.

Solution to Problem

An antireflection film for solving the above-mentioned problem comprises a film including: hollow particles; and a binder bonding the hollow particles, in which: the binder contains voids each having a cross-sectional area of less than 1,000 nm$^2$ and voids each having a cross-sectional area of 1,000 nm$^2$ or more; and the binder contains 10 or less voids each having a cross-sectional area of 1,000 nm$^2$ or more with respect to 1 µm$^2$ of a cross-sectional area of the binder.

A method of producing an antireflection film for solving the above-mentioned problem comprises: forming a paint into a film by applying the paint onto a substrate, the paint containing at least hollow particles, a binder, and a solvent, in which a content of the hollow particles is 50 wt % or more and 85 wt % or less and a content of the binder is 15 wt % or more and 40 wt % or less with respect to a total weight of a solid content of the paint, and the paint has a viscosity of 1.3 mPa·s or more and 2 mPa·s or less at its film-forming temperature; and drying the film.

Advantageous Effects of Invention

According to the present invention, it is possible to provide the antireflection film having good wear resistance and good transparency and the method of producing the antireflection film.

Further features of the present invention will become apparent from the following description of exemplary embodiments with reference to the attached drawings.

DESCRIPTION OF EMBODIMENTS

An antireflection film according to the present invention includes a film including hollow particles and a binder which bonds the hollow particles. The antireflection film according to the present invention is characterized in that the binder includes voids each having a cross-sectional area of less than 1,000 nm$^2$ and voids each having a cross-sectional area of 1,000 nm$^2$ or more, and the binder contains 10 or less voids each having a cross-sectional area of 1,000 nm$^2$ or more with respect to 1 µm$^2$ of a cross-sectional area of the binder.

Preferred embodiments of the present invention are hereinafter described in detail with reference to drawings.

Figure 1:
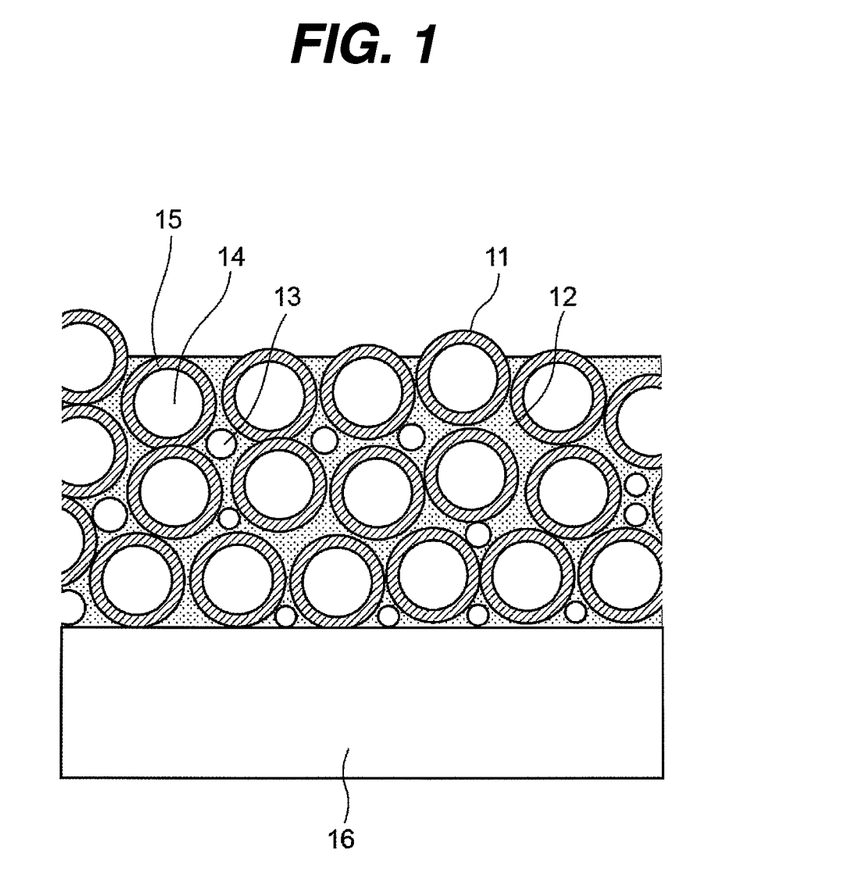
FIG. 1 is a schematic view illustrating one embodiment of an antireflection film of the present invention.

FIG. 1 is a schematic view illustrating one embodiment of the antireflection film of the present invention. In the figure, the antireflection film of the present invention includes a film including hollow particles 11 and a binder 12 which bonds the hollow particles 11, and is characterized by being formed of a construction including the hollow particles 11, the binder 12, and multiple voids 13 contained in the binder. Note that a substrate is represented by 16.

The hollow particles 11 are each formed of a particle having a vacancy 14 inside and having a shell 15 at the outer periphery of the vacancy 14. The vacancy 14 contains air (having a refractive index of 1.0), which can contribute to reducing the refractive index of the antireflection film. The type of the vacancy may be arbitrarily selected from a single vacancy type and a multiple vacancy type. Each of the hollow particles is preferably constructed of a material having a lower refractive index. Examples of the material include SiO$_2$, MgF$_2$, fluorine, and organic resins such as silicone, and SiO$_2$ is used more preferably because its particles can be produced more easily. SiO$_2$ hollow particles can be produced by using any one of the methods described in, for example, Japanese Patent Application Laid-Open No. 2001-233611 and Japanese Patent Application Laid-Open No. 2008-139581. Use of the hollow particles can reduce the refractive index of the resultant antireflection film.

The mean particle size of the hollow particles is desirably 15 nm or more and 100 nm or less, preferably 15 nm or more and 60 nm or less. When the mean particle size of the hollow particles is less than 15 nm, it is difficult to produce stably particles serving as cores. On the other hand, when the mean particle size is more than 100 nm, each space between particles becomes larger, and consequently, larger voids are easily produced and light scattering caused by larger particles occurs.

Here, the mean particle size of the hollow particles refers to their mean Feret diameter. The mean Feret diameter can be measured by subjecting an image obtained by observing hollow particles through a transmission electron microscope to image processing. It is possible use, in order to perform the image processing, a commercially available piece of image processing software such as Image-Pro Plus (manufactured by Media Cybernetics, Inc.). After contrast adjustment is appropriately conducted, if required, in a predetermined image region, particle measurement is performed to measure the Feret diameters of respective particles, and the mean Feret diameter of the particles can be determined by calculation.

The thickness of the shells 15 of the hollow particles corresponds to desirably 10% or more and 50% or less of the mean particle size, preferably 20% or more and 35% or less. It is not preferred that the thickness of the shell corresponds to less than 10%, because the strength of each particle is insufficient. Further, it is not preferred that the thickness of the shell corresponds to more than 50%, because the effect of being hollow in the particles is not remarkably exerted in the improvement of the refractive index of the resultant antireflection film.

The content of the hollow particles contained in the antireflection film of the present invention is desirably 50 wt % or more and 85 wt % or less, preferably 75 wt % or more and 85 wt % or less, with respect to the weight of the antireflection film.

An appropriate binder can be selected to be used in the present invention depending on the wear resistance, adhesive force, and environmental reliability of a target film, and an alkoxysilane hydrolytic condensate is preferred. The weight-average molecular weight of the alkoxysilane hydrolytic condensate is preferably 1,000 or more and 3,000 or less in terms of polystyrene. If an alkoxysilane hydrolytic condensate having a weight-average molecular weight of less than 1,000 is used, cracks tend to be produced after the resultant paint is cured, and the stability of the paint lowers. On the other hand, if an alkoxysilane hydrolytic condensate having a weight-average molecular weight of more than 3,000 is used, the viscosity of the resultant paint increases, to thereby tend to cause the sizes of the voids in the binder non-uniform, and consequently, voids each having a larger size are easily produced.

The content of the binder contained in the antireflection film of the present invention is desirably 15 wt % or more and 40 wt % or less, preferably 15 wt % or more and 25 wt % or less, with respect to the weight of the antireflection film.

Multiple voids are included in the binder contained in the antireflection film of the present invention. The phrase "voids are included in the binder" refers to a state in which the binder itself has voids, that is, a state in which the binder has the voids 13 in addition to the fact that the each hollow particle 11 has the vacancy 14. As described above, the binder has the voids in addition to the fact that each hollow particle has the vacancy, and hence the refractive index of the antireflection film can be reduced additionally. Thus a low refractive index film (a low refractive index layer) which has a lower refractive index can be formed.

The antireflection film according to the present invention is characterized in that the binder includes voids each having a cross-sectional area of less than 1,000 nm$^2$ and voids each having a cross-sectional area of 1,000 nm$^2$ or more, and the binder contains 10 or less voids each having a cross-sectional area of 1,000 nm$^2$ or more with respect to 1 µm$^2$ of a cross-sectional area of the binder. That is, almost all voids contained in the binder have a cross-sectional area of less than 1,000 nm$^2$.

The voids in the binder are produced under a state in which the volume of the binder is smaller than the volume of the space between the hollow particles constructing the low refractive index layer. The occurrence or absence of the production of the voids as described above can be adjusted by controlling the content ratio between the hollow particles and the binder contained in a film-forming paint. However, as the amount of the binder contained in the paint decreases and the space between the hollow particles becomes larger, the binder tends to exist locally, yielding voids having non-uniform sizes. When ordinary particles are used, such non-uniform size state does not cause any problem, but when hollow particles each having a thinner wall surrounding a vacancy are used, voids and the vacancy in each of the hollow particles are more likely to be detected with light as larger voids due to effective medium approximation of the refractive index. As a result, void sizes become non-uniform and voids each having a cross-sectional area of 1,000 nm² or more are produced, leading to the increase in the number of such voids, with the result that scattering of visible light becomes larger. Thus, the number of the voids each having a cross-sectional area of 1,000 nm² or more is preferably 10 voids/µm² or less. It is desired that the voids each having a cross-sectional area of 1,000 nm² or more is not contained more preferably.

The content of the total voids contained in the antireflection film of the present invention is, when expressed in vol % with respect to the volume of the antireflection film, desirably 5 vol % or more and 25 vol % or less, preferably 10 vol % or more and 20 vol % or less.

The antireflection film of the present invention preferably has a thickness of 80 nm or more and 200 nm or less.

A method of producing an antireflection film according to the present invention is characterized by involving forming a paint into a film by applying the paint onto a substrate, the paint containing at least hollow particles, a binder, and a solvent, in which the content of the hollow particles is 50 wt % or more and 85 wt % or less and the content of the binder is 15 wt % or more and 40 wt % or less with respect to the total weight of a solid content of the paint, and the paint has a viscosity of 1.3 mPa·s or more and 2 mPa·s or less at its film-forming temperature, and drying the film.

The content of the binder contained in the solid content of the paint is desirably 15 wt % or more and 40 wt % or less, preferably 15 wt % or more and 25 wt % or less. When the content is within the above-mentioned range, the volume of the binder is, as described above, not enough with respect to the volume of the space between the hollow particles, and hence the binder can contain voids inside. If the content is less than 15 wt %, the hollow particles cannot be well bonded to each other, resulting in the reduction in the wear resistance of the resultant antireflection film.

Further, the method of producing an antireflection film according to the present invention is characterized by using the paint, which has, at its film-forming temperature, a viscosity in the range of 1.3 mPa·s or more and 2 mPa·s or less, preferably 1.3 mPa·s or more and 1.8 mPa·s or less. When the viscosity of the paint is within the above-mentioned range, the permeability of the binder into the space between particles improves, and hence a film containing voids having a uniform size can be formed. When the standpoint described above is taken into consideration, it may be more preferred that a paint having a lower viscosity be used, but a solvent having a lower viscosity needs to be used for preparing the paint having a lower viscosity. As such solvent has a higher vapor pressure, the solvent quickly dries when the paint is formed into a film, thereby being apt to produce lines and irregularities in the film. Thus, from the standpoint of film formability influencing the outer appearance of a film or the like, it is preferred to select a solvent that is suitable for preparing a paint having a viscosity of 1.3 mPa·s or more.

The film-forming temperature is preferably 20° C. or more and 30° C. or less.

The viscosity of the paint is determined depending on the surface state and concentration of a hollow particle slurry, the molecular structure, molecular weight, and concentration of a binder, and the type of a solvent. Constructing these factors so as to prepare a paint having a lower viscosity enables the formation of an antireflection film having low light scattering property.

It is desired to use hollow particles whose surfaces are modified with methyl groups or the like because a slurry including such hollow particles tends to have a lower viscosity. Thus, when hollow silica particles are prepared, it is desired to use, as a precursor for forming a wall of a hollow particle, a trifunctional silane produced by being modified with a methyl group such as methyltriethoxysilane or methyltrimethoxysilane. Further, it may also be possible to use, as a material for the precursor, a mixture of the above-mentioned trifunctional silane and a tetrafunctional silane such as tetraethoxysilane, and it is recommended to select a composition that can contribute to establishing stable particle production.

The content of the hollow particles contained in the solid content of the paint is desirably 50 wt % or more and 85 wt % or less, preferably 75 wt % or more and 85 wt % or less. The concentration of the hollow particles contained in the paint is desirably lower in the range of a concentration that is enough for being able to form a film having a desired thickness. As the solid content concentration of a paint becomes higher, its viscosity becomes higher, and hence it is difficult to form uniform voids in a binder. Thus, it is desired to form a film under such condition that film formation can be performed even by using a paint having a lower solid content concentration.

Further, a paint having a lower binder concentration is preferably used to form a film from the same standpoint as that regarding the concentration of the hollow particle slurry.

It is possible to select suitably a solvent that has good affinity to a hollow particle slurry and a binder and use it to prepare a paint. If a solvent having low affinity is used, a binder does not dissolve in the solvent, or a binder may be dissolved in the solvent, yielding a mixture used as a paint, but their separation occurs while the paint is being formed into a film, resulting in the occurrence of a whitening phenomenon. It is preferred to use a solvent having a boiling point of 100° C. or more and 200° C. or less and a viscosity of 2 mPa·s or less, and 1-methoxy-2-propanol, methyl cellosolve, ethyl cellosolve, or the like can be used as a solvent.

The content of the solvent contained in the paint is desirably 1.5 wt % or more and 5.0 wt % or less, preferably 2.0 wt % or more and 4.0 wt % or less.

It is possible to mix solid metal oxide particles in a paint that is used in the method of producing an antireflection film according to the present invention. Use of the solid metal oxide particles can contribute to improving the wear resistance of the resultant film. The kind of particles used in the mixture is not particularly limited, and it is preferred to use particles each having a lower refractive index, such as $SiO_2$ or $MgF_2$, from the standpoint of producing an antireflection film having a lower refractive index. The mean particle diameter of the metal oxide particles is preferably 10 nm or less. The content of the solid metal oxide particles contained in the paint is preferably 10 wt % or more and 40 wt % or less.

As a substrate to be used for applying the paint, one made of glass or a resin may be used. Further, the shape of the substrate is not limited, and any of a flat shape, a curved shape, a concave shape, a convex shape, and a film shape is acceptable.

The method of applying the paint is not particularly limited, and there can be used as usual coating method for a coating liquid in a liquid state, such as a dip coating method, a spin coating method, a spray coating method, or a roll coating method. The paint is preferably formed into a film by spin coating from the standpoint that a film having a uniform thickness may be formed on a substrate having a curved shape as a lens.

Drying follows the application. The drying can be performed by using a drying machine, a hot plate, an electric furnace, or the like. The drying is performed under conditions of such a temperature and such a period of time that the drying can evaporate the organic solvent in each hollow particle without affecting the substrate. A temperature of 300° C. or less is typically preferred used.

The number of application is preferably once usually, whereas a plurality of times of drying and application may be repeated.

Meanwhile, between the substrate and a paint-coated surface, a single layer or multiple layer formed of one of a layer having a high refractive index and a layer having a medium refractive index may be present. Examples of the layer having a high refractive index and the layer having a medium refractive index may include those made of zirconium oxide, titanium oxide, tantalum oxide, niobium oxide, hafnium oxide, alumina, silica, and magnesium fluoride. Any such material can be formed into a film by, for example, a deposition method or sputtering.

Further, a layer having functionality such as water repellency or oil repellency may be formed on the surface of the paint-coated surface. Examples of the layer include a layer formed by using a paint containing fluorine and a layer formed by using a silicone paint.

The layer having a high or medium refractive index and the layer having functionality can be formed by using, for example, a vapor deposition method, a sputtering method, a CVD method, a dip coating method, a spin coating method, or a spray coating method.

Example 1

The present invention is hereinafter described more specifically by way of examples. The present invention is not limited to the following examples as long as the examples other than the following examples do not deviate from the gist of the present invention.

In this example, varied solid content concentrations were applied to prepare paints having different viscosities, and the viscosity-adjusted paints were evaluated.
(Paint)

There was produced a paint stock solution A by mixing 27.4 g of an alkoxysilane hydrolytic condensate A (manufactured by Honeywell International, Inc., T-111 having a solid content concentration of 4.5 wt %) in 18.0 g of a hollow silica slurry IPA dispersion (manufactured by JGC Catalysts and Chemicals Ltd., Throughrear 1110 having a mean Feret diameter of 55 nm and a solid content concentration of 20.5 wt %).

Next, 10 g of the paint stock solution A were diluted with 10 g (a solid content concentration of 7.2 wt %, Comparative Experimental Example 1), 20 g (a solid content concentration of 3.6 wt %, Experimental Example 1), and 30 g (a solid content concentration of 2.7 wt %, Experimental Example 2) of 1-methoxy-2-propanol (manufactured by Kanto Chemical Co. Inc., Rokutokkyuu), thereby preparing paints, respectively. The value of the solid content concentration in each set of the parentheses shows the concentration of each paint prepared.

The each resultant paint was subject to viscosity measurement by using a viscometer (manufactured by Rheo-Sense, Inc., VROC, Chip type C, a shear rate of 1/10,000 (1/s), a measurement temperature of 23° C.). As a result, Comparative Experimental Example 1 showed a viscosity of 2.3 mPa·s, Experimental Example 1 showed a viscosity of 1.8 mPa·s, and Experimental Example 2 showed a viscosity of 1.7 mPa·s.
(Film Formation)

Each paint was dropped at a volume of 0.2 ml on a glass substrate BK7 having a diameter of 39 mm and a thickness of 2 mm, followed by film formation with a spin coater. The film formation was performed by applying a different rotation speed to each paint so that the each paint was formed into a film having a thickness of 115 nm. The film formation was performed by rotating, for 30 seconds, the paint of Comparative Experimental Example 1 at 5,000 rpm, the paint of Experimental Example 1 at 3,000 rpm, and the paint of Experimental Example 2 at 1,500 rpm. The film-forming temperature in each example was 23° C. After that, each substrate on which a film had been formed was baked at 200° C. for 1 hour, yielding each substrate having an antireflection film of this example.
(Evaluation)

The each substrate having an antireflection film produced in this example was measured for its reflectance at wavelengths from 400 nm to 700 nm by using a lens reflectance measuring instrument (manufactured by OLYMPUS CORPORATION, USPM-RU). Based on the reflectance at the wavelength of 550 nm, the refractive index of each antireflection film was determined and found to be 1.27. While a load of 300 g/cm$^2$ was being applied to the each substrate having an antireflection film with a cotton fabric (manufactured by Asahikasei Chemicals Corporation, Clint), the substrate was subjected to reciprocation of 20 times. After that, the refractive index of each antireflection film was measured in the same manner as that described above and found to be 1.27. This showed that there was no variation in the refractive index, and moreover, no flaw was found.

Each substrate was slanted at an angle of 45°, and a projector was used to emit light to the back surface of the substrate to confirm how light scattered. As a result, scattering was confirmed in Comparative Experimental Example 1, but scattering was not confirmed in Experimental Examples 1 and 2, which fact showed that substrates each having a transparent antireflection film were obtained.

Further, in order to confirm the state of voids in the antireflection film on the each substrate, the each substrate was cut in its cross-sectional direction so as for the antireflection film to have a thickness of 100 nm at its cross-section by using a focused ion beam apparatus (manufactured by SII NanoTechnology Inc., SMI 3200F), and the cross-section was subjected to bright-field transmission observation in a visual field at 25,000 magnification by using a scanning transmission electron microscope (manufactured by Hitachi High-Technologies Corporation, S-5500). Void portions were intensely observed as white portions. The resultant transmission photographic image was processed by using Image-Pro Plus (manufactured by Media Cybernetics, Inc.) to measure particles each having a white portion corresponding to a void, and the number of voids each having the size of a cross-sectional area of 1,000 nm$^2$ or more was counted. As a result, the number was 26 voids/µm$^2$ in Comparative Experimental Example 1, 10 voids/µm$^2$ in Experimental Example 1, and 2 voids/µm$^2$ in Experimental Example 2.

Figure 2:
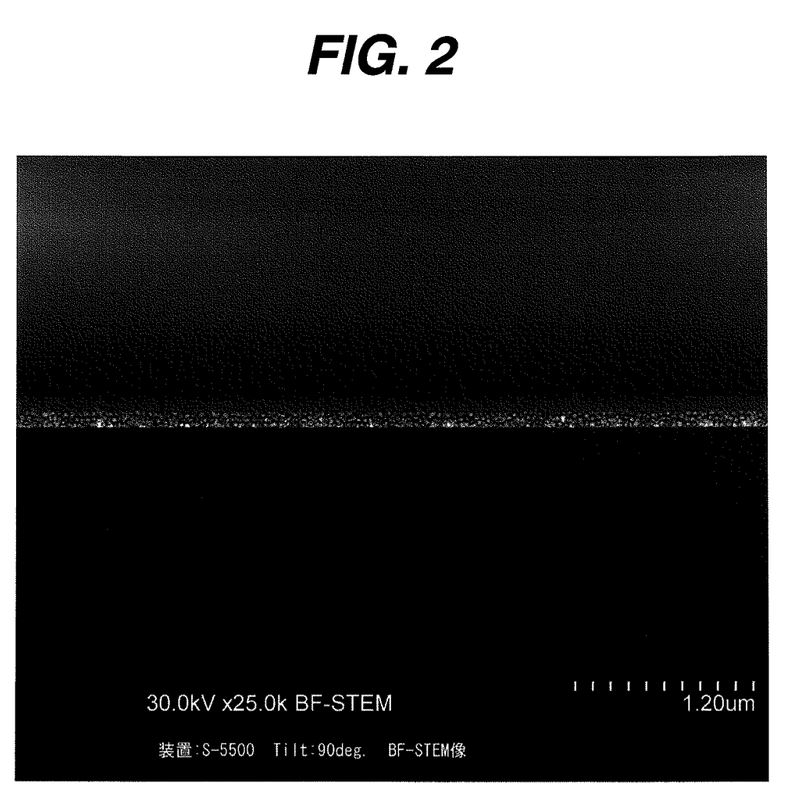
FIG. 2 is a scanning transmission electron micrograph of an antireflection film produced in Experimental Example 1 of Example 1.

FIG. 2 is a scanning transmission electron micrograph of the antireflection film produced in Experimental Example 1 of Example 1. FIG. 2 shows a state in which particles do not locally exist and film formation has been performed uniformly, and it is found that the number of larger voids each having a cross-sectional area of 1,000 nm² or more is small.

Figure 3:
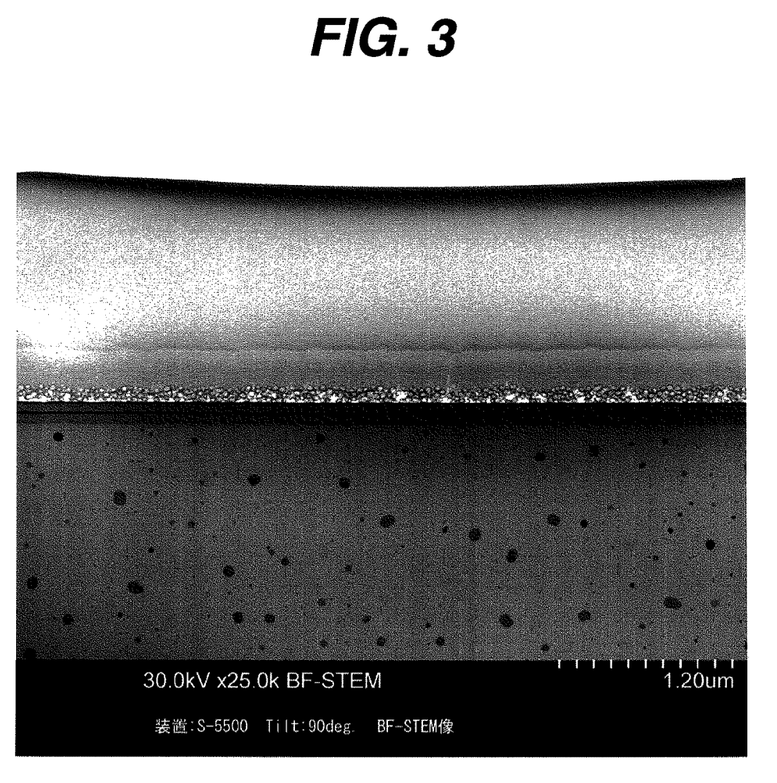
FIG. 3 is a scanning transmission electron micrograph of an antireflection film produced in Comparative Experimental Example 1 of Example 1.

FIG. 3 is a scanning transmission electron micrograph of the antireflection film produced in Comparative Experimental Example 1 of Example 1. It is found from FIG. 3 that the number of larger voids each having a cross-sectional area of 1,000 nm² or more is large because of the influence of locally existing particles.

Example 2

In this example, varied compositions of the binder contained in the paint were applied to prepare paints having different viscosities, and the viscosity-adjusted paints were evaluated.
(Paint)

There was produced a paint stock solution B by mixing 25.7 g of an alkoxysilane hydrolytic condensate B (manufactured by Honeywell International, Inc., T-214 having a solid content concentration of 4.8 wt %) in 18.0 g of a hollow silica slurry IPA dispersion (manufactured by JGC Catalysts and Chemicals Ltd., Throughrear 1110 having a mean Feret diameter of 55 nm and a solid content concentration of 20.5 wt %).

A paint stock solution C was produced based on the composition of the above-mentioned paint stock solution B, except that 10.9 g of an alkoxysilane hydrolytic condensate C (manufactured by Honeywell International, Inc., T-512B having a solid content concentration of 11.3 wt %) were mixed instead of the alkoxysilane hydrolytic condensate B.

Next, 10 g each of the paint stock solutions B and C were diluted with 20 g of 1-methoxy-2-propanol (manufactured by Kanto Chemical Co. Inc., Rokutokkyuu), yielding a paint derived from the paint stock solution B in which the solid content concentration had been adjusted to 3.6 wt % (Experimental Example 3) and a paint derived from the paint stock solution C in which the solid content concentration had been adjusted to 3.6 wt % (Comparative Experimental Example 2). The each resultant paint was subject to viscosity measurement (a measurement temperature of 23° C.) in the same manner as that in Example 1. As a result, the paint prepared in Experimental Example 3 had a viscosity of 1.7 mPa·s and the paint prepared in Comparative Experimental Example 2 had a viscosity of 2.3 mPa·s.
(Film Formation)

Each paint prepared in this example was dropped at a volume of 0.2 ml on a glass substrate BK7 having a diameter of 39 mm and a thickness of 2 mm, followed by film formation with a spin coater. The film-forming temperature was 23° C. The each paint was rotated at 3,000 rpm for 30 seconds, followed by baking at 200° C. for 1 hour, yielding an antireflection film of Experimental Example 3 and Comparative Experimental Example 2 in this example.
(Evaluation)

The each substrate having an antireflection film produced in this example was evaluated for its refractive index and wear resistance in the same manner as that in Example 1. As a result, the initial refractive index was 1.27 and there was no variation in the refractive index after a wear resistance test. Moreover, no flaw was found.

Each substrate was slanted at an angle of 45°, and a projector was used to emit light to the back surface of the substrate to confirm how light scattered. As a result, scattering was confirmed in Comparative Experimental Example 2, but scattering was not confirmed in Experimental Example 3, which fact showed that a substrate having a transparent antireflection film was obtained.

Further, in order to confirm the state of voids in the antireflection film on the each substrate, the number of voids each having the size of a cross-sectional area of 1,000 nm² or more was counted in the same manner as that in Example 1. As a result, the number was 35 voids/µm² in Comparative Experimental Example 2 and 7 voids/µm² in Experimental Example 3.

Comparative Example 1

In this comparative example, a methacrylic resin was used as a binder to prepare a paint, and the paint was evaluated.
(Paint)

There was produced a paint stock solution by diluting 18.0 g of a hollow silica slurry MIBK dispersion (manufactured by JGC Catalysts and Chemicals Ltd., Throughrear 2320 having a mean Feret diameter of 55 nm and a solid content concentration of 20.5 wt %) with the addition of 7 g of methyl isobutyl ketone (manufactured by Kishida Chemical Co., Ltd., special grade), and mixing, with the resultant mixture, 1.2 g of a methacrylic resin (manufactured by Asahikasei Chemicals Corporation, Delpet 70NH). Next, 10 g of the paint stock solution were diluted with 20 g of methyl isobutyl ketone (manufactured by Kishida Chemical Co., Ltd., special grade). The resultant paint was subject to viscosity measurement (a measurement temperature of 23° C.) in the same manner as that in Example 1. As a result, the paint had a viscosity of 3.5 mPa·s.
(Film Formation)

The paint prepared in this comparative example was dropped at a volume of 0.2 ml on a glass substrate BK7 having a diameter of 39 mm and a thickness of 2 mm, followed by film formation with a spin coater. The film-forming temperature was 23° C. The paint was rotated at 3,000 rpm for 30 seconds, followed by baking at 120° C. for 1 hour, yielding an antireflection film in this comparative example.
(Evaluation)

The substrate having an antireflection film produced in this comparative example was evaluated for its refractive index and wear resistance in the same manner as that in Example 1. As a result, the initial refractive index was 1.28 and there was no variation in the refractive index after a wear resistance test. Moreover, no flaw was found.

The substrate was slanted at an angle of 45°, and a projector was used to emit light to the back surface of the substrate to confirm how light scattered. As a result, scattering was confirmed in Comparative Example 1.

Further, in order to confirm the state of voids in the antireflection film on the substrate, the number of voids each having the size of a cross-sectional area of 1,000 nm² or more was counted in the same manner as that in Example 1. As a result, the number was 32 voids/µm².

Example 3

In this example, solid particles were mixed in the paint of Example 1, and the resultant paint was evaluated.
(Paint)

There was produced a paint stock solution E by mixing 27.4 g of an alkoxysilane hydrolytic condensate (manufactured by Honeywell International, Inc., T-111 having a solid content concentration of 4.5 wt %) and 6.0 g of a solid silica IPA dispersion (manufactured by Nissan Chemical Industries, Ltd., IPA-ST having a solid content concentration of 20 wt %) in 12.0 g of a hollow silica slurry IPA dispersion (manufactured by JGC Catalysts and Chemicals Ltd., Throughrear 1110 having a mean Feret diameter of 55 nm and a solid content concentration of 20.5 wt %). Next, 10 g of the paint stock solution E was diluted with 20 g of 1-methoxy-2-propanol (manufactured by Kanto Chemical Co. Inc., Rokutokkyuu). The thus obtained paint (solid content concentration 3.6 wt %) was subject to viscosity measurement (a measurement temperature of 23° C.) in the same manner as that in Example 1. As a result, the paint had a viscosity of 1.8 mPa·s.

(Film Formation)

The paint prepared in this example was dropped at a volume of 0.2 ml on a glass substrate BK7 having a diameter of 39 mm and a thickness of 2 mm, followed by film formation with a spin coater. The film-forming temperature was 23° C. The paint was rotated at 3,000 rpm for 30 seconds, followed by baking at 200° C. for 1 hour, yielding an antireflection film in this example.

(Evaluation)

The substrate having an antireflection film produced in this example was evaluated for its refractive index and wear resistance in the same manner as that in Example 1. As a result, the initial refractive index was 1.28 and there was no variation in the refractive index after a wear resistance test. Moreover, no flaw was found.

The substrate was slanted at an angle of 45°, and a projector was used to emit light to the back surface of the substrate to confirm how light scattered. As a result, no scattering was observed, which fact showed that a substrate having a transparent antireflection film was obtained.

Further, the state of voids in the antireflection film on the substrate was confirmed in the same manner as that in Example 1. As a result, the number of voids each having a cross-sectional area of 1,000 nm$^2$ or more was 8 voids/μm$^2$.

INDUSTRIAL APPLICABILITY

The antireflection film of the present invention can be applied to optical devices having the function of suppressing the interface light reflection level at its light incident and output plane, such as imaging instruments including a camera and a video camera and projection instruments including a liquid crystal projector and an optical scanning device in an electrophotographic machine.

REFERENCE SIGNS LIST 11 hollow particle
12 binder
13 void
14 vacancy
15 shell
16 substrate While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-257148, filed Nov. 17, 2010, which is hereby incorporated by reference herein in its entirety.

The invention claimed is:

1. A lens comprising: a substrate; and an antireflection film provided on the substrate, wherein: the antireflection film includes hollow particles and a binder; the hollow particles have a mean particle size of from 15 nm to 100 nm; the antireflection film contains voids, which are different from the hollow particles; the binder contains 10 voids/μm2 or less, each having a cross-sectional area of 1,000 nm2 or more with respect to 1 μm2 of a cross-sectional area of the binder; and a content of the voids contained in the antireflection film is from 5 vol % to 25 vol % with respect to the antireflection film.

2. The lens according to claim 1, wherein the antireflection film is transparent.

3. The lens according to claim 1, wherein the lens is configured for use in a camera or a video camera.

4. The lens according to claim 1, wherein the antireflection film is provided directly on the substrate.

5. The lens according to claim 1, wherein the hollow particles comprise a shell having a thickness corresponding to from 10% to 50% of the mean particle size.

6. The lens according to claim 1, wherein the content of the voids contained in the film is from 5 vol % to 20 vol % with respect to the film.

7. The lens according to claim 1, wherein the binder contains 2 voids/μm$^2$ to 10 voids/μm$^2$, each having the cross-sectional area of 1,000 nm$^2$ or more with respect to 1 μm$^2$ of the cross-sectional area of the binder.

8. A method of producing a lens, the method comprising:
forming a paint into a film by applying the paint onto a substrate, the paint containing at least hollow particles, a binder, and a solvent, in which a content of the hollow particles is from 50 wt % to 85 wt % and a content of the binder is from 15 wt % to 40 wt % with respect to a total weight of a solid content of the paint, and the paint has a viscosity of from 1.3 mPa·s to 2 mPa·s at its film-forming temperature; and
drying the film to form a lens,
wherein the lens is the lens according to claim 1.

9. The method of producing the lens according to claim 8, wherein the binder comprises an alkoxysilane hydrolytic condensate.

10. The method of producing the lens according to claim 8, wherein the film-forming temperature is from 20° C. to 30° C.

11. The method of producing the lens according to claim 8, wherein the paint further comprises solid metal oxide particles.

12. The method of producing the lens according to claim 8, wherein the forming the paint into the film is performed by spin coating.

13. The method of producing the lens according to claim 8, wherein the content of the voids contained in the film is from 10 vol % to 20 vol % with respect to the film.

14. The method of producing the lens according to claim 8, wherein the film is transparent.

15. The method of producing the lens according to claim 8, where the paint is applied directly onto the substrate.

* * * * *